Jan. 19, 1965   J. A. WAIDELICH, JR   3,166,623
SPHERICAL LENS IMAGING DEVICE
Filed Dec. 29, 1960   3 Sheets-Sheet 1
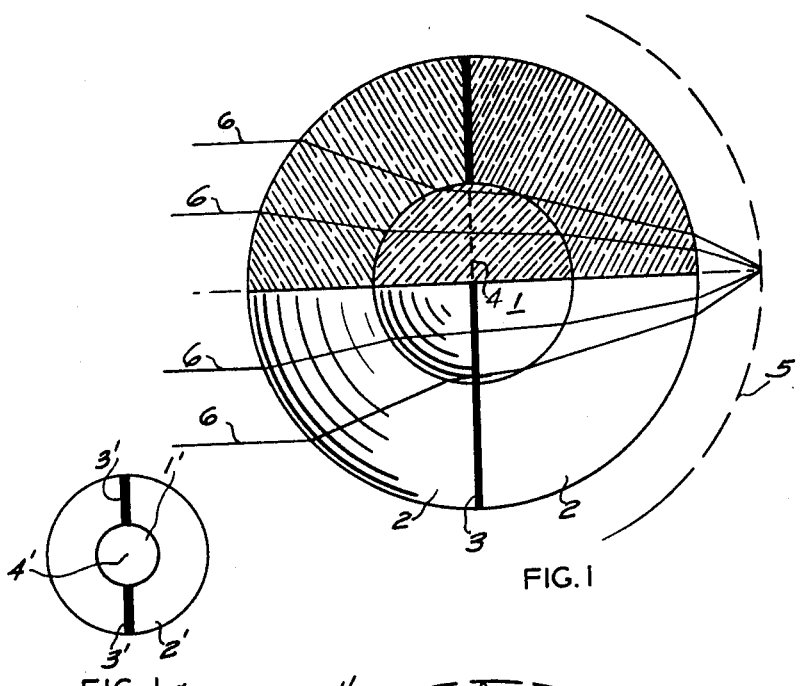
FIG. 1a
FIG. 1
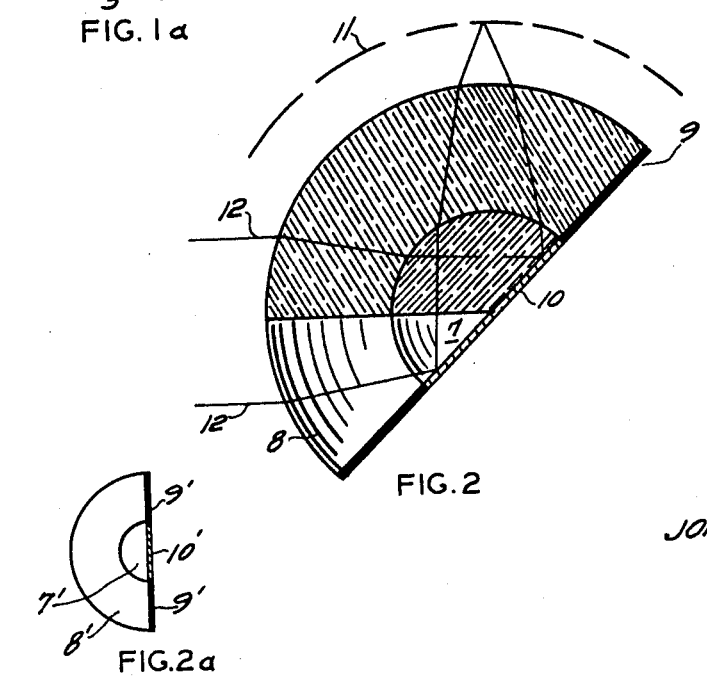
FIG. 2a
FIG. 2
JOHN A. WAIDELICH, JR.
INVENTOR
BY
ATTORNEY Jan. 19, 1965   J. A. WAIDELICH, JR   3,166,623
SPHERICAL LENS IMAGING DEVICE
Filed Dec. 29, 1960   3 Sheets-Sheet 2

JOHN A. WAIDELICH, JR.
INVENTOR

BY Rankin A. Milllin
ATTORNEY

United States Patent Office 3,166,623
Patented Jan. 19, 1965

3,166,623
SPHERICAL LENS IMAGING DEVICE
John A. Waidelich, Jr., Endwell, N.Y., assignor to Link Division of General Precision, Inc., Binghamton, N.Y., a corporation of Delaware
Filed Dec. 29, 1960, Ser. No. 79,236
6 Claims. (Cl. 88—1)

This invention relates to improvements in systems for conveying images of objects located in restricted or inaccessible locations to selected locations remote therefrom.

It is an object of this invention to provide apparatus for imaging at a remote location the objects in an optical field of greater depth than has hitherto been possible, with greater freedom from aberration than has hitherto been attainable.

It is a further object of this invention to provide a "high speed" imaging device (i.e., one having an $f$-number of 33 or less) whereby the objects in a restricted optical field of considerable depth may be imaged onto the input end of a fiber image conduit with a high degree of freedom from aberration.

Still another object of this invention is to provide an imaging device which may serve as terminating means for a fiber image conduit whereby the image carried by said conduit may be presented for observation upon an image screen with high luminous intensity and a high degree of freedom from aberration.

Yet another object of this invention is to provide an endoscope, or borescope, whereby images of objects in inaccessible locations, such as the interior of the human body, or of certain mechanical apparatus, may be presented to an observer with a high degree of versimilitude.

An additional object of this invention is to provide means whereby endoscopes, or borescopes, introduced into interior cavities of the human body, or of mechanical apparatus, may present to an observer images of the objects in optical fields within said cavities having considerable angular extent and depth, said endoscopes, or borescopes, being conveniently manipulable within said cavities, without the necessity of removing and inserting the apparatus when it is desired to deviate the angle of vision from the main axis of the apparatus.

Another important object of the invention is the provision of means for imaging upon the photocathode of television pickup tube means an image of a field of view located very close to the image pickup point, which field is of considerable depth and must be conveyed to said photocathode with a high degree of freedom from aberration.

Other objects of the invention will in part be obvious and will in part appear hereinafter.

The invention, accordingly, comprises the features of construction, combinations of elements, and arrangements of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 1 is a considerably enlarged view, partially in section, of a lens according to the invention;

FIG. 1a is a schematic symbol used herein to represent the device of FIG. 1;

FIG. 2 is a considerably enlarged view, partially in section, of a further embodiment of the instant invention;

FIG. 2a is a schematic symbol used herein to represent the device of FIG. 2;

Figure 3A:
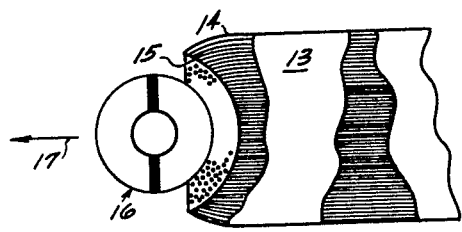
FIG. 3a is a schematic view showing one possible end configuration of a fiber image conduit, and its relationship to a device of the type of FIG. 1.

In the following specification and claims the term "spherical" is used in its generic significance to include all bodies which have at least one surface area all points of which are substantially at a common distance from a point. It will be recognized that this is the sense in which the term "spherical" is commonly used in the optical art, as, for instance, when workers in the optical art refer to a plano-concave lens (which has, generally, one planar surface, one cylindrical surface, and one spherical surface) as a "spherical" lens.

The term "beam-splitter" as used hereinbelow refers to those partially reflective, partially transmissive mirrors, sometimes called "half-silvered," which pass a part of a beam of impingent light, and reflect another part thereof.

The term "lens" as used hereinafter refers not only to simple, single element, lenses, but to multi-element lenses, and also to lenses which contain as an integral part of their structure a diaphragm means including a stop.

The terms "body" and "element" as used herein are used in their generic significance to include any mass or portion of matter distinct from other masses, whether having a shape of its own, or being amorphous and depending upon adjacent bodies, or a container, to preserve its shape. For instance, a "body" or "element," as the terms are used herein, may include a body of refractive liquid, acting as a lens, which depends for its shape totally upon being confined within, or between, a solid element, or elements, acting conjointly with it as a lens, or lenses. The term "body" or "element" as used herein also embraces within its scope coatings which may be either refractive or light obstruent, and may be applied by well known processes such as cataphoresis, evaporation, electroplating, vacuum-plating, or the like.

The term "body" or "element," as used herein, also embraces certain arrangements wherein bodies of refractive liquid are given effective shape by being contained within a container, or shell, which is itself so thin as to have negligible optical effect.

It is to be understood that the refractive materials used for the composition of the "bodies" or "elements" referred to herein are not restricted to the more conventional optical materials, such as glass, but may also include the more recently used "plastic" materials, such as methyl methacrylate resins, polystyrene resins, cellulose acetone compounds, and the like.

The term "fiber image conduit" is used herein in its generic significance to include all of the now well-known image conveying means comprising bundles of refractive, or dielectric, fibers, or cylinders, which are used to transfer images from place to place, to selectively alter images to produce desirable properties, or both.

FIG. 1 shows a lens according to the invention consisting of a core element and a single shell element concentric with said core element. While, in a practical embodiment, substantially all of the aberrations in a lens according to the invention can be corrected to a fraction of the Rayleigh limit in a lens having a core and a single concentric shell (i.e., a shell having a common center with said core) it will be recognized that for some applications it may be desirable to employ a plurality of concentric shells.

In this embodiment the solid, spherical core element 1 has a diameter equal to the inside diameter of spherical shell element 2 (shown in the drawing as comprising two half sections). The passage of light along, as distinct from through, shell 2 is entirely blocked by diaphragm 3 which extends from the outer periphery of shell 2 to the outer periphery of core 1. The rays of light 6 which pass through aperture 4 located at the common center of core 1 and shell 2 in diaphragm 3 will, of course, pass first through concentric shell 2, then through core 1, and then again through shell 2, before being focused at image surface 5. As will be observed from the parallel disposition of the portion of rays 6 impinging upon the lens, the particular lens design shown in FIG. 1 may be used to focus objects "at infinity," although, as will become apparent to those skilled in the art, the relative proportions of core 1, shell 2, and aperture 4, may be so selected that objects in a spherical image surface opposite image surface 5 and at a finite distance from the lens may be brought to focus at image surface 5. While core 1 and shell 2 are shown in FIG. 1 as integral elements, or, at least, made up of elements having the same radius throughout, it should be noted that in many practical embodiments of the invention the portions of core 1, or shell 2, or both, located on opposite sides of diaphragm 3 may be of different diameters. Additionally, shell 2, for instance, may have flatter portions at opposite ends of a diameter of diaphragm 3 for mounting purposes, or other practical reasons, or may otherwise be adapted for ease of manufacture or mounting by being other than completely spherical. In every case, however, the spherical faces of said core and said shell will be substantially concentric.

FIG. 1a shows a schematic symbol used herein to designate a lens of the invention of substantially the type shown in FIG. 1. In this schematic symbol the inner circular area 1' represents the core 1 of the device of FIG. 1; the circular area 2', the outer shell 2; the dark radial lines 3', the diaphragm 3; and the open portion 4', the aperture 4 of FIG. 1.

FIG. 2 shows a second embodiment of the instant invention. This second embodiment of the instant invention differs from the embodiment of FIG. 1 principally in that core 7, corresponding to core 1 of FIG. 1 and shell 8, corresponding to shell 2 of FIG. 1, are hemispherical, rather than spherical. Diaphragm 9 of FIG. 2 corresponds in its structure and function to diaphragm 3 of FIG. 1. Located substantially in the same plane as that of diaphragm 9 is a reflective means 10 which is disposed over the equatorial plane of hemispherical core 7, and which serves to reflect light rays 12 which have passed once through shell 8, and through core 7, such that these rays pass again through core 7, thence again through shell 8, and are brought to focus at image surface 11. By this means a device is provided which has substantially all the advantages of the device of FIG. 1, and which, at the same time, can be used to deviate the pencil of rays passing through it over a wide range of desired angles.

FIG. 2a shows a schematic symbol which is used herein to represent a device according to the invention substantially as shown in FIG. 2. Inner semi-circular area 7' corresponds to core 7 of FIG. 2; outer semi-circular area 8', to shell 8 of FIG. 2; radial lines 9', to diaphragm 9; and the central sectioned line 10' to reflective means 10 of FIG. 2.

While the selection of the materials for the core element and the shell element, or elements, of the instant invention, the relative diameters of the said elements, and the diaphragm material and stop diameter, will be within the scope of the ordinary optical designer seeking to produce a lens of great freedom from aberration and high relative aperture according to the instant invention, the materials and proportions of a typical embodiment are presented in the following tabulation, in which the terminology employed is well known to those skilled in the optical arts.

[Focal length 2.207 mm. Relative aperture $f/2$]

| Lens Dimensions, mm. | Glass Type | |
|---|---|---|
| $r_1 = 1.324$ $t_{12} = 0.754$ | 1.60500 | V. No. 38.0 |
| $r_2 = 0.570$ $t_{23} = 1.14$ | 1.52400 | V. No. 59.5 |
| $r_3 = -0.570$ $t_{31} = 0.754$ $r_4 = -1.324$ | 1.60500 | V. No. 38.0 | where:
$2r_1$ = outer diameter of shell.
$2r_1 - 2t_{12}$ = inner diameter of shell.
$2r_2$ = diameter of core.
$2r_2$ = diameter of aperture in FIG. 1 (diameter of reflector in FIG. 2).

From the above it will become apparent to those skilled in the art that, following the teachings of the instant invention, it is possible to produce an imaging device having, inter alia, the dual advantages of great freedom from aberration and relative apertures of the practical range necessary in medical, television, and related fields of application, i.e., having $f$-numbers of 33 or less.

FIG. 3a shows in schematic form an embodiment of the instant invention comprising in combination a lens 16 of the type shown in FIG. 1 and a fiber image conduit 13. Fiber image conduit 13 is of the well-known type discussed hereinabove. In this embodiment, the individual fibers of conduit 13 are "necked down" at the end shown in FIG. 3a and brought together at a surface 15 which coincides with the image surface of lens 16. As shown at 17, when the lens of the type shown in FIG. 1 is employed in conjunction with a fiber image bundle, the field of view of the combination is approximately straight forward along the axis of the end portion of the fiber bundle.

Figure 3B:
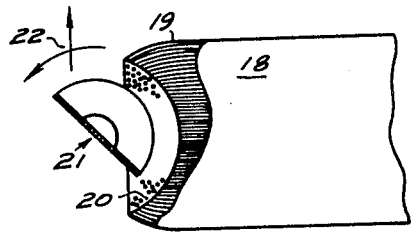
FIG. 3b is a schematic view showing a possible end configuration of a fiber image conduit, and its coaction with a device according to FIG. 2.

FIG. 3b shows in schematic form a combination according to the instant invention comprising a fiber image conduit and a lens 21 substantially according to FIG. 2. As in FIG. 3a, the individual fibers of fiber image conduit 18 are "necked down" at their ends and brought together at a surface 20 which coincides with the image surface of lens 21. One of the advantages derived from the employment of the lens of the type shown in FIG. 2 in conjunction with a fiber image conduit is the fact that the axis of vision of the combination may be set, e.g., at 90 degrees to the axis of the end portion of the fiber bundle, as shown by the straight arrow at 22. An additional advantage which resides in the employment of a lens substantially as shown in FIG. 2 in conjunction with a fiber image conduit resides in the fact that (by means not shown) lens 21 may be made selectably orientable with respect to the axis of the end of the fiber image conduit, thereby providing for the exploration of larger image fields.

Figure 3C:
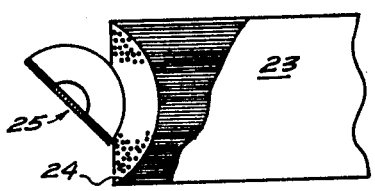
FIG. 3c is a schematic view showing another possible end configuration of a fiber image conduit, and its coaction with a device after FIG. 2.
Figure 3D:
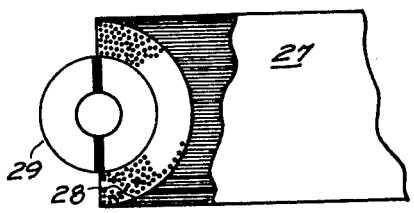
FIG. 3d is a schematic view showing the same end configuration of a fiber image conduit, and its coaction with a device according to FIG. 1.

FIGS. 3c and 3d show schematically additional embodiments of the invention in which the terminal portions of the individual fibers of fiber image conduits 23 and 27 are not "necked down," but merely terminated at surfaces 24 and 28, which correspond to the image surfaces of lenses 25 and 29. It may be seen that, despite their much smaller light gathering ability, ease of manufacture may make the embodiments of the invention shown in FIGS. 3c and 3d preferable to those shown in FIGS. 3a and 3b.

Figure 4A:
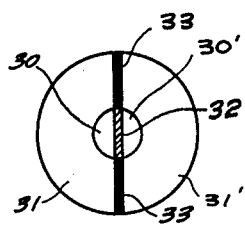
FIG. 4a is a schematic symbol representing an alternative embodiment of the invention.

FIG. 4a shows in schematic form an additional embodiment of the lens according to the invention which will have certain advantages in practical applications evident to those skilled in the art. Numbers 30 and 31 refer, respectively, to a core and a shell of the type described hereinabove. Numeral 33 refers to a diaphragm which corresponds in structure and function to the diaphragm 3 of FIG. 1. Numeral 32 refers to a reflective means corresponding to element 10 of FIG. 2, but which is made reflective on both sides, as contrasted with the element 10 of FIG. 2 which is made reflective only on one side.

Figure 4B:
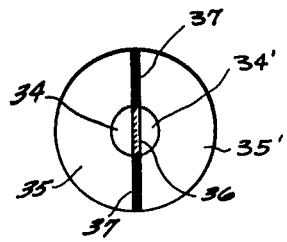
FIG. 4b is a schematic symbol representing a further embodiment of the invention.

FIG. 4b represents schematically an additional embodiment of the lens of the invention. There is a direct correspondence between the parts of FIG. 4b and those of FIG. 4a, numeral 30 of FIG. 4a corresponding to numeral 34 of FIG. 4b; numeral 31, to numeral 35; and numeral 33, to 37. FIG. 3b, however, differs from FIG. 4a in that reflective means 36 of FIG. 4b is a beam-splitter, whereas the corresponding element 32 of FIG. 4a is completely opaque and reflective on both sides.

Figure 5:
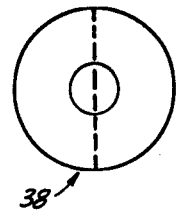
FIG. 5 is a generalized schematic symbol used herein to represent any of the devices of the invention as shown, e.g., in FIGS. 1, 1a, 2, 2a, 4a, and 4b.

In FIG. 5 is shown a schematic symbol which is used herein to represent generally any one of the lens embodiments according to the instant invention.

Though the aperture in the diaphragm is shown in the drawings herein as of the same diameter as the core, it is to be clearly understood that in many cases the aperture in a practical lens will not have a diameter equal to that of the core. In some practical cases it will be convenient and desirable to so design the lens as to make the aperture diameter equal to the core diameter. In no case, however, will the aperture diameter approach in smallness such a size that it functions only as a "pinhole," since a pinhole can pass only rays substantially perpendicular to the surfaces of the refractive elements (i.e., the shell, or shells, and the core), thus vitiating the operation of said elements as lenses.

Figure 6:
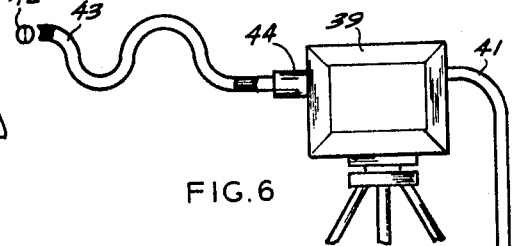
FIG. 6 represents a television system according to the invention.

FIG. 6 shows a television system adapted, by means of the instant invention, for producing on the screen of a monitor images from restricted or inaccessible locations. The television camera tube of this system may, for instance, be of the photo-conductive type (e.g., a vidicon), or of the type which provides image enhancement by storage (e.g., an image orthicon), or any other type having specific advantages which will occur to those skilled in the art. Camera 39 is connected by means of cable 41, which may include one or more intermediate amplification and/or control stages, to monitor 40. The input lens, which may be, in a given application, any one of the lenses of the instant invention, is shown at 42. Fiber image conduit 43 leading from lens 42 to camera 39 may be terminated for coaction with lens 42 in either of the ways shown in FIGS. 3a and 3b, or in FIGURES 3c and 3d, or in any other way best suited to the purpose at hand. For instance, where a lens of the type shown in FIGURE 1 is employed it may be desirable to set the radius of the exit hemisphere of the lens equal to the focal length of the entrance hemisphere of the lens, and to cement, or otherwise fix, the forward portion of fiber image conduit 43 to the surface of the exit hemisphere. The termination of fiber image conduit 43 at camera 39, generally indicated at 44, may be accomplished in several ways. For instance, 44 may comprise a clamp through which the fibers of fiber image conduit 43 pass and in which said fibers are fixed, such that the camera-adjacent end of fiber image conduit 43 is cemented, or otherwise affixed, directly to the outer face of the photocathode of the camera tube. Also, as is well known in the art, a camera tube may be employed in which the camera-adjacent end of the fiber image conduit is formed as a portion of the end wall of the camera tube, with the active photocathode material deposited on the inner portion thereof. Alternatively, 44 may comprise a conventional set of lenses for imaging the image carried by the fiber image conduit onto the photocathode of the camera tube. In this case, preferably, the camera-adjacent end of the fiber image conduit may be shaped to conform to the image surface of said set of lenses, although, in some cases, it may be more desirable to provide a flat termination at the end of fiber image conduit 43, and to provide a separate field flattener for "matching" the flat end of the fiber image conduit 43 to said set of lenses.

Figure 7:
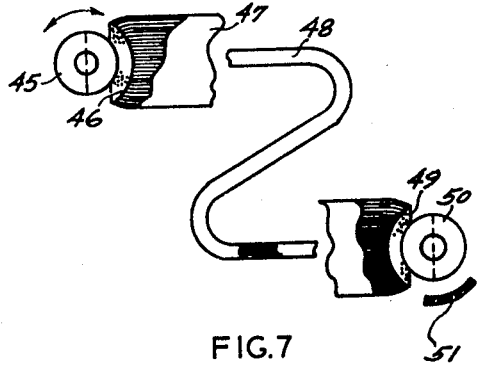
FIG. 7 represents an optical system according to the invention for viewing the objects in remote or restricted image fields without the interposition of electronic means.

In FIGURE 7 is shown an optical system according to the instant invention having an optical (as distinguished from electronic) output member. Input lens 45 may be "matched" to fiber image conduit 47 by shaping the end of fiber image conduit 47 according to any of the teachings of FIGURE 3, or, if a lens according to FIGURE 1 is employed, the exit hemisphere radius may be selected equal to the focal length of the entrance hemisphere and fiber image conduit 47 may be affixed directly to the surface of the exit hemisphere. The fiber image conduit, as indicated at 48, may be highly flexible, and of a length limited only by the absorption of the material employed, and of state of the art fabrication capabilities. At the output end of fiber image conduit 47, a lens 50, which may, according to the application, be any of the lenses of the instant invention, is disposed for transferring the image carried by fiber conduit 47 onto a viewing means, e.g., a well known diffusing screen. If a lens of the full sphere type shown in FIGURE 1 is employed in this embodiment it may, for instance, be desirable to set the radius of the exit hemisphere equal to the focal length of the entrance hemisphere, in which case, the surface of the exit hemisphere may be given a diffusing treatment so that it may serve as the viewing means. It sometimes may, however, be considered desirable to employ a separate diffusing screen, generally spherical in configuration, shown at 51. It will be evident that the device of FIGURE 7 will be useful, for instance, in borescopes for the inspection of inaccessible internal portions of complex machinery, or in endoscopes, for use in the medical examination of the inaccessible cavities of the body. The input lens 45 may be made selectively orientable from adjacent the viewing end of the fiber image conduit by means which will occur to those skilled in the art.

Figure 8:
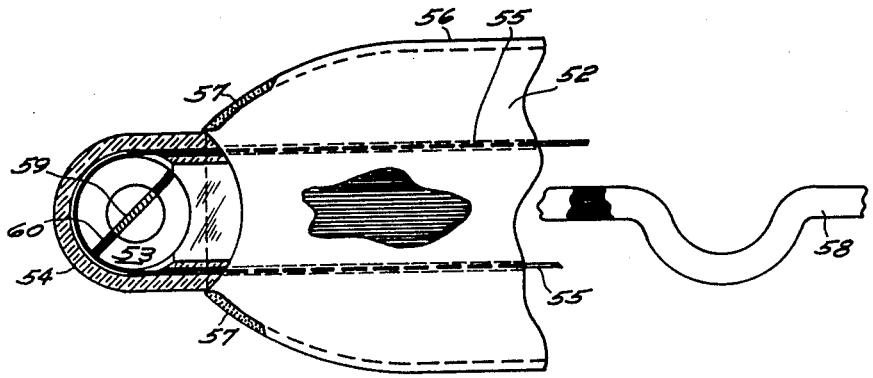
FIG. 8 is a schematic representation of the objective end of a variable deviation endoscope, or borescope, according to the invention.

FIGURE 8 shows certain features of construction of a borescope, or endoscope, according to the invention. The flexible central portion of the associated fiber image conduit 58 is shown merely schematically. The outer, or viewing, portion of the device of FIGURE 8 may be any one of the viewing means shown in or described in connection with FIGURE 7. The terminal portion of fiber image conduit 58 is designated 52. A suitable lens for use in this embodiment is indicated generally at 53. The lens shown at 53 is the lens shown in, and described in connection with, FIGURE 4a, that is, a "double" version of the lens of FIGURES 2 and 2a having a central reflector element 59 located in the aperture of diaphragm 60, said central reflector element being reflective in both directions from the plane of diaphragm 60. The lens elements disposed on opposite sides of reflector element 59 and diaphragm 60 may be entirely alike, thereby obviating the necessity of turning lens 53 through large angles in order to view fields on either side of the device, or may be of different configuration, having, e.g., different focal lengths, and thereby making it possible to operatively emplace within the cavity to be examined two lenses of different characteristics, e.g., one focused at infinity, the other focused at close range, in a single insertion. Lens 53 is carried rotatably in an outer, transparent jacket 54 which is fastened to the end of fiber bundle 58. The desired orientation of lens 53 may be accomplished from the opposite end of fiber bundle 58 by means of two extremely fine wires 55 which pass along the length of the fiber image conduit through channels formed by the removal, or emission, of two of the light conducting fibers, and which pass through an equatorial channel around the periphery of lens 53, and are fastened to a common point, for instance, one portion of the periphery of diaphragm 60. While, in such an arrangement, a small portion of the field of view of the lens element 53 will necessarily be blocked by the equatorial channel, the added flexibility of operation resulting therefrom clearly outweighs such disadvantage. In the manner well known in the art, light for illumination of the area viewed through lens 53 may be conducted through a plurality of selected light conducting fibers 56 to terminal portions 57 which, of course, will be sand-blasted, or otherwise given a diffusing surface so that substantial portions of light may leave fibers 56 thereat.

In some cases it may be desirable to employ the lens shown in FIGURE 4b in any one of the devices of FIGURES 6, 7, or 8. When this is done, local illumination of a small area of vision, having a particular orientation with respect to the diaphragm and half-silvered reflector of the lens, may cause the lens to operate in either the entirely refractive or in the entirely reflective manner, or in such manner as to superimpose a view through the reflector upon a reflected view. Illumination of only selected areas of the field of view for this type of operation may be produced by illuminating only selected ones of the separate light supply conduit arrangements 56, 57 shown in FIGURE 8, which arrangements, and selectable iluminating means, may be employed in the devices of either FIGURE 6 or FIGURE 7.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is particularly noted that although the expression "diaphragm," and similar expressions, have been employed to describe the obstruent means surrounding the central aperture, or reflector, of the lenses of the invention, this obstruent means may in practical applications take many forms other than a substantially planar form and, in fact, may in some applications be a generally annular solid body, or a gap in the lens, defining a generally conical input lens volume leading to the aperture, or reflector, and a generally conical output volume leading therefrom. It will be appreciated that while the lenses, or parts thereof, are described herein as "spherical," or "hemispherical," they may in fact have shapes only generally meeting these terms, and determined largely by practical considerations as, for instance, the shape of necessary mounting means.

Particularly, the terms "hemispherical," and "hemisphere," as used herein are used to describe lenses, or lens segments, which are only generally hemispherical in configuration, but which are characterized by being substantially confined within only one half of the volume occupied by the full lens of the invention.

Applicant's spherical lens invention may, of course, be used in combination with other light image utilization means than fiber image conduits. For instance, the spherical lens of applicant's invention may be used in combination with such well known light image utilization means as curved diffusing screens and cameras employing curved photo sensitive plates, or films which are brought into curved configuration by well known pressure means. Further, the spherical lenses of applicant's invention may be employed in other well known optical devices, such as flight training devices, one type of which is shown in U.S. Patent 2,591,752 to Wicklund, and wherein one of the reflective spherical lenses of applicant's invention may, to great advantage, be used to replace elevation prism 70. In this application, however, it may be necessary, or desirable, to employ in conjunction with applicant's spherical lens a well known field flattener.

Other modifications of the construction shown and described herein may, of course, be made without departing from the scope of the invention. For instance, the device shown in FIG. 7 may employ at its outer, or eyepiece, end, one of the more conventional type eyepieces, rather than the spherical lens eyepiece shown and described hereinabove. Also, in the combination of FIG. 6, an image intensifier tube may be substituted for the camera and monitor combination shown and described hereinabove. Furthermore, the illuminating radiation employed in the lenses and systems of this invention is not necessarily restricted to the visible spectrum. Also, the photocathodes or faceplates of camera tubes or image intensifier tubes may be conformed to the image surfaces of spherical lenses according to the inventions.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An imaging device comprising: a spherical core element, at least one spherical shell element concentric with said core element; light obstruent means having an aperture located substantially about the common center of said elements said aperture having a diameter equal to the diameter of said spherical core element; total reflective means positioned in said aperture, a fiber image conduit means operatively associated with said imaging device, said fiber image conduit means being rigidly affixed to the surface of the exit hemisphere of said imaging device; and the radius of the exit hemisphere of said imaging device being equal to the focal length of the entrance hemisphere of said imaging device.

2. An imaging device comprising: a spherical core element; at least one spherical shell element concentric with said core element; light obstruent means having an aperture located substantially about the common center of said elements; and a fiber image conduit; the fibers of one end of said image conduit terminating at the exit hemisphere surface of said imaging device.

3. An imaging device comprising: a spherical core element; at least one spherical shell element concentric with said core element; light obstruent means having reflective means located substantially at the common center of said elements; and fiber image conduit means the individual fibers of which terminate at one end in the image surface of said elements; said element and said light obstruent means being selectively orientable with respect to said fiber image conduit.

4. An imaging device comprising: a spherical core element; at least one spherical shell element concentric with said core element; light obstruent means having an aperture located substantially at the common center of said elements, the diameter of said aperture being substantially equal to the diameter of said spherical core element and fiber image conduit means secured to said imaging device, the input end of said fiber image conduit means being shaped to correspond to the exit hemisphere radius of said imaging device.

5. An imaging device having substantially the following numerical data:

[Relative aperture =$f/2$. Focal length =2.207 mm.]

| Lens Dimensions, mm. | Glass Type | |
|---|---|---|
| | $n_D$ | V |
| $r_1 = 1.324$ | | |
| $t_{12}=0.754$ | 1.60500 | 38.0 |
| $r_2 = 0.570$ | | |
| $t_{23}=1.14$ | 1.52400 | 59.5 |
| $r_3 = -0.570$ | | |
| $t_{34}=0.754$ | 1.60500 | 38.0 |
| $r_4 = -1.324$ | | | in which: ($r_1$ to $r_4$) = the radii of curvature of the several optical lens surfaces, $t_{12}$, $t_{23}$, and $t_{34}$ = the axial thicknesses between the refracting lens surfaces, $n_D$ = the index of refraction for the D line of the lens materials, and V = the Abbe dispersion number of the lens materials.

6. An imaging device comprising,
  (a) a plano-convex lens including at least one planar surface and at least one spherical surface;
  (b) at least one single shell element contiguous to and concentric with said at least one spherical surface; said at least one single shell element having an inner diameter equal to the outer diameter of said at least one spherical surface of said plano-convex lens;
  (c) a diaphragm extending from the outer periphery of said at least one single shell to the outer periphery of said at least one spherical surface of said plano-convex lens;
  (d) fiber image conduit means associated with said imaging device, at least one terminal end of said conduit means being necked down to coincide with the image surface of said imaging device to provide a field of view of said combination which is approximately straight forward along the axis of said at least one terminal end of said conduit means; and
  (e) reflective means disposed over the equatorial plane of said at least one spherical surface of said plano-convex lens and positioned in the plane of said diaphragm.

References Cited in the file of this patent
UNITED STATES PATENTS

| | | |
|---|---|---|
| 2,858,453 | Harris | Oct. 28, 1958 |
| 2,968,228 | Merritt | Jan. 17, 1961 |
| 2,987,960 | Sheldon | June 13, 1961 |
| 3,051,049 | Linke | Aug. 28, 1962 |
| 3,051,166 | Hovnanian | Aug. 28, 1962 |

FOREIGN PATENTS

| | | |
|---|---|---|
| 2,193 | Great Britain | 1859 |

OTHER REFERENCES

Jenkins et al.: Fundamentals of Optics, Second Edition; published by McGraw-Hill, 1950, page 164 relied on.

Baker: Problems in Wide-Angle Lens Design, Photogrammetric Engineering, vol. 20, No. 3, June 1954, pages 493–495 relied on.